Patented Mar. 16, 1948

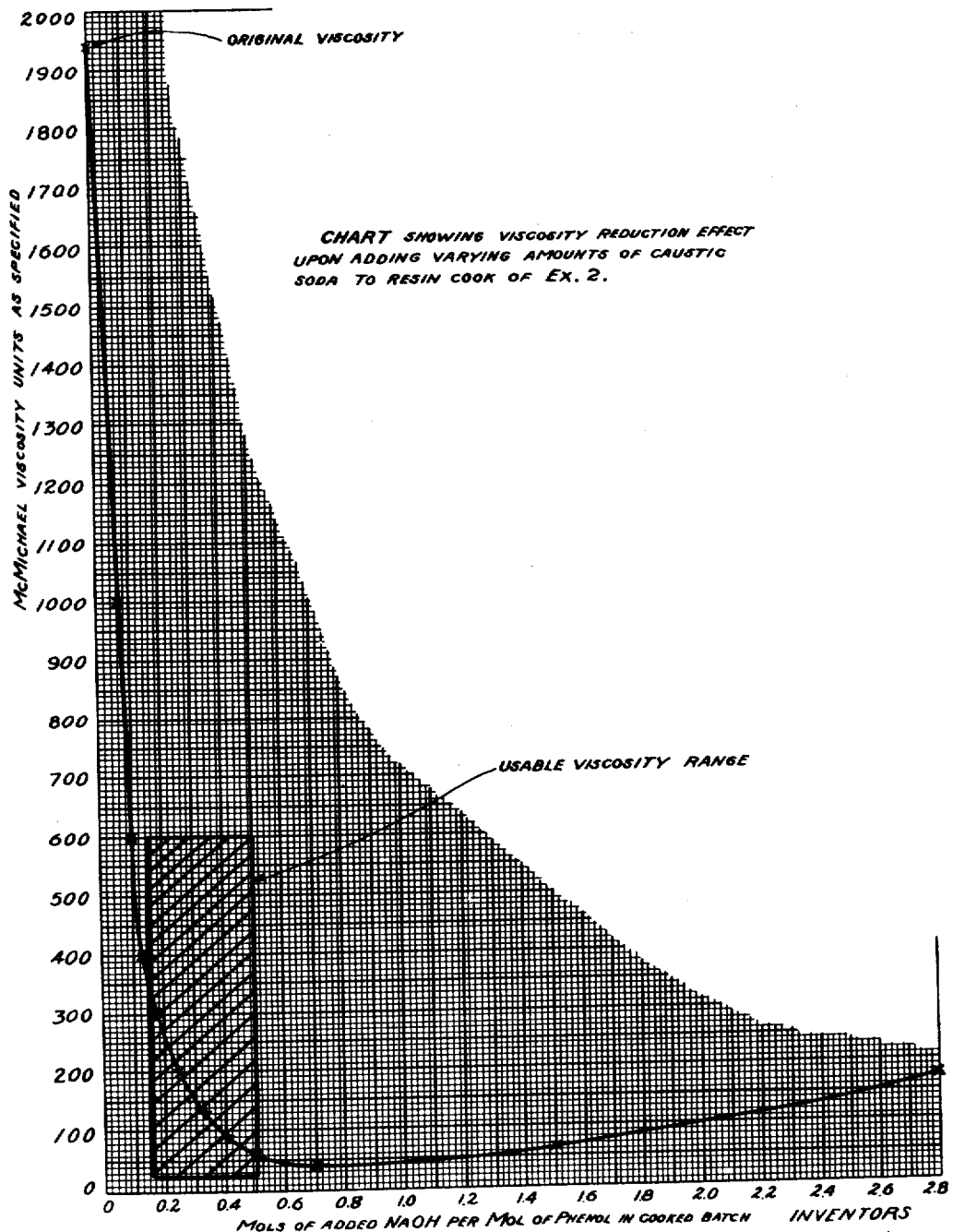

2,437,981

UNITED STATES PATENT OFFICE 2,437,981

PHENOLIC RESIN ADHESIVE

John Thomas Stephan, Reino Alexander Jarvi, and Jacob Richard Ash, Seattle, Wash., assignors, by mesne assignments, to Monsanto Chemical Company, Seattle, Wash., a corporation of Delaware Application October 4, 1944, Serial No. 557,204

5 Claims. (Cl. 260—57)

The object of this invention is to provide a highly reactive phenol-formaldehyde resin glue for making hot pressed plywood. There is insistant demand for more exterior grade plywood glued with phenolic resin but production has been restricted by low hot press output due to the inherent comparatively slow thermosetting characteristic of phenolic resins. Improvement in this feature has been diligently sought ever since this type of glue was first used and reference is made to the co-pending application, Serial Number 461,008 of C. F. Van Epps, filed October 6, 1942, now U. S. Patent 2,360,376, granted Oct. 17, 1944, which describes a fast setting phenolic glue that since its introduction, and because of its rapid setting and good adhesive character, has been used extensively, particularly in the manufacture of exterior grade Douglas fir plywood. This type of resin is made by cooking an aqueous mixture of phenol with between about 2 and 3.50 molecules of formaldehyde and between about 0.2 and 1.0 molecule of caustic soda for each molecule of the phenol to form the thermosetting adhesive. It is noted that the entire quota of each of these elements which is specified for the Van Epps formulation is added to the initial reaction mixture. Since commercial formalin is used, which always contains a certain amount of methanol as a stabilizer, this reaction, although aqueous in character, is carried out in the presence of methanol and this feature is significant in connection with our invention.

Specifically, we have discovered that the hot press reactivity of these improved glues may be further substantially increased by modifying the resin through proper control of either the caustic soda alone or preferably both the caustic soda and methanol constituents. We also find that ammonia may be used so as to contribute to the usefulness of the glue. We find that when, as in both the Van Epps formulation and that of the present invention, an excess of formaldehyde over and above two molecules per molecule of phenol is provided, an important gain in reactivity can be secured by the following procedure over and above that obtained by the Van Epps formulation. In the Van Epps formulation, conditions are set up which permit some destruction of excess formaldehyde by the operation of the Cannizzaro reaction and, in fact, the Cannizzaro reaction is intentionally promoted and utilized in the Van Epps glue as a means of eliminating or reducing objectionable formaldehyde odor consequent upon the presence of this excess formaldehyde. In our formulation, we intentionally control the caustic soda factor in such a way as to entirely suppress the Cannizzaro reaction. As a result, a different and more reactive phenol resin molecule is obtained. Besides the distinVan Epps adhesive. By-product methanol is of course, as a consequence of this procedure, further distinguished from the Van Epps adhesive by the absence of Cannizzaro by-product methanol and sodium formate which residues are shown by analysis to be always present in the Van Epps adhesive. By-product methanol is here distinguished from the methanol content of the original formalin and by-product sodium formate is likewise distinguished from the sodium formate normally formed by reaction of caustic soda with the formic acid which is also a normal constituent of the original formalin. We eliminate the odor of the thus preserved excess formaldehyde by treatment with ammonia. We find that the resulting formaldehyde-ammonia compound both increases the storage life of the adhesive and the constituent formaldehyde is still available and effective to accelerate the final setting of our glue. We thus also avoid objectionable formaldehyde odor but our glue is more reactive.

As a result of these discoveries, the glue of the present invention can be converted about twenty percent faster in the hot press than the Van Epps glue and is further distinguished from the latter in not being substantially thinnable by further addition of caustic soda.

In making up the Van Epps resin, the cooking is terminated before a degree of viscosity is reached which would be too high to produce a glue within the range of viscosity practically useful for glue spreading. Our discoverey permits us to carry the cooking to a much higher viscosity and then, by subsequent addition of caustic soda or other alkali, we obtain a resin syrup which is thereby thinned to a value which provides spreadable glue viscosity and at the same time is decidedly quicker setting. The further advance in the preliminary polymerization of the resin secured by this procedure is also an important factor in developing this important but hitherto unattainable improvement in quick setting character. Control of the methanol content, the addition of ammonia and the suppression of the Cannizzaro reaction combine with this feature to contribute additional utility.

Our new procedure is operable within the range of composition mentioned above for the Van Epps adhesive although the formaldehyde lower limit is slightly raised from 2 molecules to about 2.25 molecules. The caustic soda, however, is no longer all added initially as in the Van Epps procedure, although the total caustic, as in the former invention, should not exceed about 1.0 molecule and it is important to restrict the portion of caustic soda in the initial reaction mixture within a critical range between about 0.15 and 0.50 molecule per molecule of phenol. As compared to the Van Epps formulation, our procedure of providing only a critically restricted amount of caustic in the initial cook and then adding the remaining caustic subsequently provides a water-soluble phenolic resin adhesive which, although it has a general similarity to the product of the Van Epps formulation, has a different and improved final composition which is reflected in a markedly improved adhesive behavior. The difference in composition includes the presence of a significant and identifiable amount of formaldehyde not combined with phenol not found in the Van Epps composition as well as a resulting different and more favorable molecular character. This excess of formaldehyde is over and above substantially two molecules of formaldehyde combined with each molecule of phenol. There is also the new feature that our adhesive is substantially non-thinnable by further addition of caustic soda as compared to the thinnable character of the Van Epps adhesive under the same treatment. These differences in composition and behavior are reflected in the vitally important improved glue characteristic of converting about twenty percent faster in the hot press than the Van Epps glue. These features will be described subsequently in connection with examples of specific glues.

It is understood that, in the press treatment of these resin glues, to a large extent time and temperature are interchangeable so that the improved reactivity of the present adhesive may be utilized either as ability to set in less time at the same press temperature or to be converted at lower press temperature, or both, whichever is most convenient. The usual range of press temperatures between about 220° and 300° F. may be used for time periods which will, of course, vary with the thickness of the assembly and the press temperature but which will be at least twenty percent shorter than with the Van Epps formulation. The mechanical pressure will be controlled by the species and condition of the wood as in former practice. The resulting substantial gain in press capacity is of vital commercial importance since the added output is urgently needed and can be obtained from the same press equipment and with less production cost.

The following examples illustrate but do not limit the practice of our invention. They describe making specific batches of condensation products with various materials and proportions of ingredients illustrating operation over a wide range of conditions. All of these batches were cooked at atmospheric pressure in a reaction kettle provided with a reflux condenser and efficient means for heating, stirring and cooling.

The following technical ingredients were used:

Barrett's 90–92% technical phenol containing 8% water
Barrett's 80–82% metacresol
Dupont's technical 37% formalin
Standard technical caustic soda
Standard technical methanol
Technical denatured ethyl alcohol With reference to the phenol: the present invention obtains improved results with phenolic materials as defined in the Van Epps invention. These materials are "phenols having a distillation range between 180° and 220° C. and not containing more than about 15% of at least one phenol selected from the group consisting of orthocresol, xylenol and mixtures thereof." Since the primary objective of the present invention is to obtain the maximum reactivity, it is preferable to select from this class the phenol materials best suited for that objective. These are preferably phenol itself and metacresol. Such materials may be used in technical grades such as the above which contain only insignificant amounts of such less reactive homologues as ortho- and para-cresol. Pure phenol and metacresol are, of course, entirely satisfactory.

With reference to the formalin: one grade of this formalin containing about 10.0% methanol was used in Examples I, II, and III, recited below, while another grade containing 7.5% methanol was used in the remaining examples. Other technical formalins of equivalent composition are satisfactory.

In place of caustic soda, the more expensive caustic potash will also produce equivalent results although its use is not usually economic.

The ethyl alcohol is a blend made by mixing about 100 gallons of 95% ethyl alcohol, about 2.5 gallons ethyl acetate, about 2.5 gallons synthetic methanol and about 5 gallons of gasoline.

Where other reagents such as ammonia and sulfuric acid are required, the usual technical grades are satisfactory.

When referring to filler materials, the mesh or particle size stated in the examples indicates that substantially all the particles will pass a screen having the stated number of meshes per square inch.

Viscosity is expressed herein and in the appended claims in terms of the #26 wire MacMichael viscosimeter using a 3 centimeter immersion of a 1 centimeter diameter brass bob carrying at its lower end a 0.635 centimeter (¼ inch) thick brass disc 4.44 centimeters (1¾ inches) in diameter, the cup being revolved at 24 R. P. M. The above method of measuring viscosity is commonly used in commercial glue room practice. It is understood that, while the MacMichael viscosimeter is most convenient for glue determinations, the range of a single bob and wire is comparatively narrow and extends only from 0 to 300 units. It is, however, readily possible, by using other viscosimeter wires having a known ratio to the #26 standard wire, to interpolate higher viscosity readings onto the MacMichael scale. In many instances, the viscosities recorded in the examples are higher than the actual 300 unit range of the MacMichael scale. In all such cases, the readings have been taken with a wire of suitable higher range and then interpolated to their equivalents on the theoretical extension of this scale. This makes all the viscosity determinations comparable on a basis familiar in glue room practice. It is noted that these MacMichael viscosities as set forth herein may be converted into centipoises by multiplying them by fifteen and the viscosity figures in the Van Epps specification may, of course, be converted into MacMichael units by dividing the Van Epps readings by fifteen.

Example I

Ingredients: Grams
- Phenol, 1 mol. ----------------------- 4080
- Formalin (10% methanol content), 3 mols. ------------------------------- 9720
- 50% NaOH, 0.2 mol. (1st alkali) ------ 640
- 50% NaOH, 0.4 mol. (2nd alkali) ---- 1280
- Dilution water ---------------------- 1440
- 28% ammonia ------------------------ 775

The phenol, formalin and first alkali were mixed and then brought up to refluxing temperature in about 5 minutes and refluxed for about 47 minutes, then cooled to room temperature in about 15 minutes. The batch at this stage had a viscosity of 430 units. (This viscosity is somewhat too high for satisfactory spreading on Douglas fir even when it is not desired, as in this case, to incorporate a filler, which addition, of course, would further increase the viscosity by adding to the content of solids in the glue.)

The second alkali, dilution water and ammonia were then added and the batch stirred for 15 minutes. It is to be noted that the second alkali was added while the batch was at room temperature. A marked thinning effect resulted and the viscosity was reduced to a final value of about 25 units. For use in gluing Douglas fir, it was desired to incorporate an absorbent material to reduce glue penetration and also increase the viscosity to a value well within the preferred range for spreadability on Douglas fir which is between about 25 and 350 units. Accordingly, about 1930 grams of about 325 mesh wood flour were stirred into the glue. This raised the viscosity to about 140 units. The addition of ammonia was in the exact amount which eliminated the previous strong odor of formaldehyde and did not impart an odor of ammonia. Resin solids in the glue as used were about 37.1%.

Example II

Ingredients: Grams
- Phenol, 1.0 mol. --------------------- 4080
- Formalin (10% methanol content), 3.0 mols. ------------------------------- 9720
- 50% NaOH, 0.3 mol. (1st alkali) ------ 960
- 50% NaOH, 0.3 mol. (2nd alkali) ---- 960
- Dilution water ---------------------- 996
- 28% ammonia ------------------------ 1328

The phenol, formalin and first alkali were mixed and then brought up to refluxing temperature in about 5 minutes and refluxed for about 45 minutes. The temperature of the batch was then reduced to about 184° F. for about 12 minutes and then reduced to about 155° F. for about 17 minutes. The extent of condensation and polymerization at this stage was measured by quickly cooling a sample to about 70° F. and determining the viscosity which was found to be about 1940 units and hence too high for spreadability. While the batch was still at the elevated temperature of about 155° F., the second alkali, dilution water and ammonia were added successively and the batch cooled to about 70° F. in about 15 minutes. A marked thinning occurred when the caustic was added and the viscosity, after these additions, was about 25 units. This viscosity is at the extreme lower limit for proper spreadability but the liquid is conveniently thin for pouring in and out of drums for use at the plywood plants. There, the addition of about 1804 grams of 325 mesh wood flour in the glue mixer brings the viscosity up to about 130 units, producing glue of the desirable spreadability and quick-setting properties for use in making Douglas fir plywood. It is noted, as in the case of Example I, that the addition of ammonia eliminated all odor of formaldehyde without leaving any ammoniacal odor. Resin solids in the glue as used were about 37.1%.

Example III

Ingredients: Grams
- Phenol, 1.0 mol. --------------------- 4080
- Formalin (10% methanol content), 2.25 mols. ------------------------------- 7320
- 50% NaOH, 0.15 mol. (1st alkali) ---- 480
- 50% NaOH, 0.45 mol. (2nd alkali) ---- 1440
- Dilution water ---------------------- 2246
- 28% ammonia ------------------------ 117

The phenol, formalin and first alkali were mixed, then brought up to refluxing temperature in about 5 minutes and refluxed for about 66 minutes. The temperature of the batch was then reduced to about 154° F. for about 5 minutes. A cooled sample at 70° F. showed the viscosity at this stage to be about 3860 units. The second alkali, dilution water and ammonia were then added to the hot liquid and the batch cooled to about 70° F. in about 15 minutes. This addition reduced the viscosity to a value of about 25 units. To adapt for gluing Douglas fir, 1568 grams of 325 mesh wood flour were added. This raised the viscosity to about 163 units. The odor of formaldehyde was absent from the glue. Resin solids in the glue as used were about 37.4%.

Example IV

Ingredients: Grams
- Metacresol, 1.0 mol. ----------------- 3240
- Formalin (7.5% methanol content), 3.0 mols. ------------------------------- 7290
- Ethanol ----------------------------- 327
- 50% NaOH, 0.3 mol. (1st alkali) ------ 720
- 50% NaOH, 0.56 mol. (2nd alkali) ---- 1332

The metacresol, formalin, ethanol and first alkali were mixed and brought up to refluxing temperature in about 5 minutes and refluxed for about 6 minutes. The temperature of the batch was then reduced to about 150° F. and held at that point for about 40 minutes. A cooled sample at 70° F. showed the viscosity at this stage to be about 9000 units. The second alkali was then added to the hot liquid and the batch cooled to about 70° F. in about 15 minutes. This addition reduced the viscosity to a final value of about 300 units which was suitable for direct use on Douglas fir without the addition of a filler. Resin solids in the glue as used were about 45.8%.

This glue had a strong odor of formaldehyde. It is noted that the added ethanol brings up the total alcohol content to equal the amount which would have been present in the cook if a winter grade formalin containing 12% methanol had been used in the reaction mixture. Although in this instance, a large part of the alcohol was ethyl, no loss of reactivity or unfavorable characteristics were noted as compared to the results obtained with all methyl alcohol.

This example illustrates the use of metacresol and also the practicability of a quick-setting glue made up without the use of ammonia. While this glue remains usable for only about 48 hours, this short usable life period is practical where it is desired to make up the glue in the plywood plant for prompt use but, for shipment or uses requiring some storage, we find that the addition of sufficient ammonia to eliminate the odor of free formaldehyde without giving any ammoniacal odor provides the further important advantage of extending the life of the glue for about two weeks without any loss of reactivity. In most cases, this addition would be desirable.

Example V

Ingredients:

| | Grams |
|---|---|
| Phenol, 1.0 mol | 4080 |
| Formalin (7.5% methanol content), 3.0 mols | 9720 |
| Methanol | 1215 |
| 50% NaOH, 0.3 mol. (1st alkali) | 960 |
| 50% NaOH, 0.4 mol. (2nd alkali) | 1280 |
| Dilution water | 1472 |
| 28% ammonia | 900 |

The phenol, formalin, alcohol and first alkali were mixed and brought up to refluxing temperature in about 5 minutes and refluxed for about 56 minutes. The batch was then cooled to about 160° F. in about 5 minutes and held there for about 35 minutes. The viscosity of the cooled sample at 70° F. at this stage was found to be about 50,000 units.

The second alkali, dilution water and ammonia were then added to the hot liquid and the batch cooled to about 70° F. in about 25 minutes. The finished batch had a viscosity of about 72 units. To adapt the glue for Douglas fir, 983 grams of 325 mesh wood flour were added. This raised the viscosity to a value of about 180 units. This glue was free from formaldehyde odor. The total methanol content in this example equals the amount which would have been present if a special formalin of 20% methanol content had been used in the initial reaction mixture. Although no detrimental features were found in the product, no advantage was noted as compared to products made the same way but with the methanol content reduced to about 12%. Resin solids in the glue as used were about 35.6%.

Example VI

Ingredients:

| | Grams |
|---|---|
| Phenol, 1.0 mol | 4,080 |
| Formalin (7.5% methanol content), 3.5 mols | 11,320 |
| Methanol | 509 |
| 50% NaOH, 0.5 mol. (1st alkali) | 1,600 |
| 50% NaOH, 0.33 mol. (2nd alkali) | 1,056 |
| Dilution water | 715 |
| 28% ammonia | 2,260 |

The phenol, formalin, alcohol and first alkali were mixed and then brought up to refluxing temperature in about 5 minutes and refluxed for about 33 minutes. The batch was then cooled to about 180° F., held at that temperature for about 30 minutes, then cooled to about 150° F. and held at that temperature for an additional 30 minutes. A cooled sample at 70° F. gave a viscosity of about 7500 units. The second alkali, cooling water and ammonia were then added and the batch cooled to about 70° F. in about 15 minutes. The finished glue had a viscosity of about 40 units. 3440 grams of a filler mixture composed of half 200 mesh walnut shell flour and half china clay were added to adapt for gluing Douglas fir. This changed the viscosity to about 340 units. This glue was free from the odor of formaldehyde or ammonia. Resin solids in the glue as used were about 31.8%.

Example VII

Ingredients:

| | Grams |
|---|---|
| Phenol, 1.0 mol | 4080 |
| Formalin (7.5% methanol content), 3.0 mols | 9720 |
| 1 N.H$_2$SO$_4$ | 600 |
| Methanol | 436 |
| 50% NaOH, 0.017 mol. (pH adjustment alkali) | 53 |
| 50% NaOH, 0.30 mol. (1st alkali) | 960 |
| 50% NaOH, 0.40 mol. (2nd alkali) | 1280 |
| 28% ammonia | 1110 |
| Dilution water | 1410 |

The phenol, formalin, acid and methanol were mixed, the resulting pH being 1.1. The mixture was brought to refluxing temperature in about 5 minutes and refluxed for about 250 minutes. At this stage, the batch was a fairly homogeneous emulsion which, upon test by cooling a sample, gave a viscosity of about 3840 at about 70° F. The pH at this stage was found to be about 3.2. The batch was then cooled to about 150° F. in about 15 minutes and 53 grams of 50% NaOH were added, bringing the pH of a cooled sample at 70° F. to about 5.9 with a viscosity of about 4500 units. At this stage, the batch was still an opaque emulsion. Then a further 960 grams of 50% NaOH were added and the pH raised to about 9.8 which rendered the solution clear and homogeneous and reduced the viscosity of a cooled sample to about 15 at about 70° F. The mixture was then reheated to refluxing in about 10 minutes and refluxed for about 8 minutes. It was then cooled to about 150° F. in about 4 minutes and held at that temperature for about 48 minutes at which point a viscosity test of a cooled sample gave a reading of about 3600 units. A further addition of 1280 grams of 50% NaOH was then made and the batch was cooled to about 70° F. in about 20 minutes when the viscosity was found to be about 320 units with a pH value of about 10.8 (uncorrected value Coleman glass electrode pH meter). 1110 grams of 28% ammonia and 2060 grams of water were added. This gave a viscosity of about 27 units and removed the odor of formaldehyde which had previously been apparent to an objectionable degree. There was no odor of ammonia. To adapt the glue for Douglas fir, 3130 grams of a filler mixture were added, made up of half 200 mesh walnut shell flour and half china clay. This gave an adhesive having a viscosity of about 93 units. Resin solids in the glue as used were about 32.2%.

This example illustrates the practicability of first making a phenolic resin under acid conditions and then reacting it with caustic soda and thinning it with a further addition of caustic to produce a quick-setting adhesive after the method of our present invention.

The temperature of the second alkali, dilution water and ammonia in the foregoing examples, when added to the cooked resin, is usually in the neighborhood of about 70° F. regardless of whether the resin solution is at normal temperature or at elevated temperature.

The presence of ammonia and the alcohols referred to in the foregoing examples, while highly desirable, is not at all times necessary, but it is essential in the carrying out of the invention that there be a preliminary cook in the presence of a critical amount of caustic alkali as described, followed by the addition of further caustic alkali whereby to reduce the viscosity of the resin solution. In this connection, the addition of the further alkali does not arrest the resin reaction as, for example, after the manner described in the patent to Nevin, 2,150,698, but, on the contrary, will accelerate the reaction.

The viscosity of the resultant product, after addition of a critical amount of further caustic as described in the examples, is substantially unaffected by the inclusion of more caustic, i. e., it is not thinnable by the addition of further caustic as distinguished from the resin prepared in the aforementioned Van Epps patent.

The products prepared in accordance with the foregoing examples, having been reduced to a viscosity permitting them to be suitably dried in a spray drier, may be dried as a powder in this manner and readily converted or reconstituted to a suitable adhesive by the addition of water. This procedure is feasible either by spray drying the product of the initial reaction as set forth in any of the preceding examples in which case the water-soluble powder may be mixed with water with added alkali in place of the secondary alkali addition described in the examples, or the final adhesive resin described in the foregoing examples may be spray dried producing a water-soluble powder which may be reconstituted into an equivalent glue by mixing with water alone. In that case, the addition of further alkali becomes unnecessary since the secondary alkali was already present in the syrup which was dried. In either case, a highly reactive adhesive is obtained and the advantage of eliminating water and obtaining a storable dry glue base is secured.

These examples illustrate various phases of the use of additional caustic soda, after an initial cooking of the resin, to produce a marked reduction in viscosity with a number of important attendant advantages. Experience has shown that these resins are practical as spreadable adhesives for plywood in general between the viscosity range of about 25 units as the minimum and about 600 units as the maximum and a resin solids content between about 25% and 45%. Actually, under normal conditions for Douglas fir plywood in particular, it is preferable to have the final viscosity in the range between about 25 and 350 units but the desirable viscosity must not be obtained at the expense of resin solids. The lower limit of resin solids content for effective plywood adhesion is about 25% while economical use of a relatively expensive adhesive will usually require a reduction of resin solids content below at most about 45%. Since these resins are water-soluble, water is available as a diluent but, if the resins are originally cooked to the high viscosities recommended by the teaching of our invention, it would actually be impossible to bring the viscosity down to the desired range for spreading with water alone because the amount of water required would reduce the solids content far too much for satisfactory adhesion. With our use of added caustic soda, due to its remarkable thinning effect, we escape this limitation and a small amount, added either alone or with water, produces a very great reduction in viscosity. It is noted, for example, that the highest viscosity obtained by the cooking reaction in any of the Van Epps examples is 307 (Example II) while the lowest viscosity at the end of the initial cook in any of the foregoing examples is 430 (Example I) while all of our other examples range still higher up to 50,000 (Example V).

All of the foregoing glues were tested for reactivity in hot press manufacture of Douglas fir plywood. Tests were also made comparing the press output obtainable with the adhesives of the present invention with that obtainable with the Van Epps adhesive. All of the glues, when used in hot press gluing of assemblies of Douglas fir plies having a thickness of 1⅛ inch between press plates having a temperature of 285° F., were able to produce strong bonds with 6½ minutes in the hot press. In general, each of the foregoing seven examples produced glues which enabled the hot press to increase its output at least 20% as compared with the Van Epps adhesive. The plywood produced was of equally high grade, readily passing the standard tests of the Douglas Fir Plywood Association for exterior grade plywood. Very large scale commercial practice has confirmed the increase in press output and high quality of product indicated by the above comparison. These glues, of course, may also be used for laminating and impregnating work in general. Such uses may require a lower range of viscosity than the range desirable for plywood glues.

EFFECT OF CAUSTIC SODA

As distinguished from including the total caustic soda in a single step initially, we obtain markedly improved results by adding the caustic soda in more than one step. Thus, the resin is initially formed by the Van Epps method of cooking in the presence of caustic soda, although we use a restricted amount, and we then modify it by one or more subsequent small additions of caustic soda. As distinguished from the caustic soda which is added after the initial cooking to modify the character of the resin, we find that the initial caustic, when practicing our invention, should range between about 0.15 and 0.50 molecule per molecule of phenol in the resin and the total caustic, both initial and added, should range between about 0.30 and 1.00 molecule.

We have discovered that there is another significant relationship to be considered in the formulation of the caustic soda content of our initial reaction mixture which is an important departure from the teaching of the Van Epps invention and is effective in obtaining the desired improved speed of conversion of the adhesive. This is a reduction of the range of caustic soda content below a critical value in proportion to the formaldehyde content instead of in relation to the phenol content.

In the Van Epps examples, the caustic soda, all of which is added to the initial reaction mixture, ranges between a maximum of 25% and a minimum of 16% of a gram-mole of caustic for each gram-mole of formaldehyde present. Not only do we find it advantageous to split the caustic soda constituent into two parts (one part being added to the reaction mixture and another part being added after the initial reaction) but we find it is important to restrict that portion of the caustic which is added initially to a lower range of values between a maximum not exceeding substantially 14% of a gram-mole of caustic and a minimum of about 7% of a gram-mole of caustic for each gram-mole of formaldehyde present.

In connection with commercial experience with the Van Epps adhesive as well as extensive laboratory investigation of the reaction, we have discovered that, upon analysis the Van Epps formulation shows a loss of formaldehyde in the form of byproduct methanol and sodium formate, probably due to the operation of the well-known Cannizzaro reaction and that the relatively high proportion of caustic soda present in the Van Epps reaction mixture apparently is responsible for this loss since we find it promotes the Cannizzaro reaction. We find that, if we restrict the caustic soda present in the initial reaction to the lower range of values between about 7% and 14% of a molecule per molecule of formaldehyde, then upon analysis no destructive breakdown of formaldehyde or Cannizzaro byproduct methanol and sodium formate can be detected. We have determined this fact by analysis for combined and uncombined formaldehyde in all of the Van Epps examples and in all of our examples. In all of the Van Epps examples, this loss of formaldehyde occurs while no loss is detected in the analysis of our examples. We have not been able to determine with certainty the mechanism by which this result is brought about but, at any rate, we find that restriction of the initial caustic soda according to the foregoing rule is accompanied by an increase in desirable final glue reactivity and we believe that there is an accompanying favorable effect on the molecular structure of the unconverted adhesive which facilitates rapid conversion. It seems to us probable that our procedure obtains a maximum content of reactive methylol groups in the resin molecule and perhaps the groups are more favorably located for prompt conversion to the final insoluble polymerized adhesive resin on the glue line. As a result of these investigations as to the chemical structure of the phenol-formaldehyde molecule which is most useful in hot press adhesives, we are of the opinion that, for utility as a thermosetting adhesive, the molecule which results from the combination of about two molecules of formaldehyde with one of phenol is the most reactive type. We are also of the opinion that this combination must be effected in the initial reaction and if a less proportion of formaldehyde than two molecules is combined in the initial reaction, even though further amounts of formaldehyde are available uncombined, such excess is mere surplusage and is ineffective and unavailable for subsequent combination, for example, in the hot pressing operation. This is true even though, as is frequently the case in such reactions, more than the theoretical combining proportion of formaldehyde seems needed initially to insure the right final product. In both the Van Epps formulation and in ours, it will be noted that more than two molecules of formaldehyde per molecule of phenol are available but it is our belief that the conditions of the Van Epps initial reaction prevent the full amount of two molecules combining with the phenol while the conditions of our reaction permit the desired amount to combine and that we thereby produce a more reactive material. This theory has strong confirmation both in the improved reactivity of our adhesives and also in the analytical results. In the case of the Van Epps resins, we have analyzed for combined formaldehyde in the resin at the end of the cook and find that in all cases there is considerably less than two molecules. Furthermore, not only is there a deficiency of combined formaldehyde below two molecules but there is also a deficiency of determinable excess formaldehyde which should exist as the difference between two molecules and the total amount of formaldehyde in the original reaction mixture. In the case of our resins, our analysis shows that two molecules have been combined and furthermore we are able to find substantially the full residue over and above two molecules which was originally present in the reaction mixture. We believe that the destruction of formaldehyde which evidently occurs in the Van Epps cooks must, therefore, be due to the operation of the Cannizzaro reaction. Furthermore, we believe that our restriction of the initial caustic soda content to the lower range below that found in the Van Epps cooks not only eliminates loss of formaldehyde by entirely suppressing the Cannizzaro reaction but also creates some favorable situation which directs the reaction to obtaining the desired full combination of two molecules of formaldehyde per molecule of phenol.

With reference to the added or second caustic, as shown by the accompanying drawing, we find that the best useful results are obtained only when the caustic addition ranges substantially between the limits of 0.15 and 0.50 molecule based on the phenol content. Outside of these limits, satisfactory viscosity for commercial spreading is not obtained. While it is usually preferable to add the caustic soda during the later stage of the cooking, it is also practical to control viscosity and reactivity by adding the caustic soda at room temperature before the glue is used. This is especially advantageous when working with a spray dried resin which is still responsive to the thinning effect of caustic soda when the resin is redissolved in water.

Briefly summarized, the principal effects which we obtain by the addition of caustic soda after the initial reaction are as follows:

(1) It has a very marked thinning effect, greatly reducing the viscosity of the initial cook.

(2) This thinning permits further cooking which affords desirable and hitherto unobtainable further pre-polymerization of the resin.

(3) The storage life of the resin is improved, i. e., the resin molecule is less prone to self-polymerization during storage although the component chemical groups which seem to be temporarily blocked evidently return to a highly reactive state under the influence of heat during pressing.

(4) The setting of the glue in the hot press is substantially accelerated. We believe that the caustic soda accomplishes this by promoting rapid gelling and dehydration under the influence of heat on the glue line and at the same time attacks the wood and produces the well-known caustic soda effect of swelling and gelatinizing the wood fibers which contributes to the formation of a more intimate and strong glue bond.

The accompanying chart illustrates graphically the striking viscosity-reducing effect of adding caustic soda to the resin after it has been originally cooked in the presence of caustic soda according to the Van Epps method.

In explanation of the chart, the extreme range of viscosity practical for glue spreading for the glue of this invention is between approximately 25 and 600 units, MacMichael, and the preferred range is between about 25 and 350 units. The amount of additional caustic soda required to produce a commercially satisfactory glue in this range of viscosity we find lies, as stated, substantially between 0.15 and 0.50 molecule per molecule of phenol in the cook.

Referring to the chart, the rectangular cross-hatched area will be noted which is bounded by viscosity limits between 25 and 600 units and caustic soda limits between about 0.15 and 0.50 molecule. This particular chart is based on Example II, the preferred example for making our improved resin, and consequently, in this case, the starting point for showing the effect of added caustic soda is 1940 MacMichael units on the viscosity scale at the left of the chart, this being the viscosity of that example at the end of the initial cooking. It will be noted that, upon the further addition of caustic soda, the viscosity drops from the initial value of 1940 units with extreme rapidity and, when the addition reaches about 0.15 molecule, the line enters the cross-hatched area of spreadable viscosity at a value of about 350 units. Further additions of caustic soda depress the viscosity still more but the line does not leave the area of spreadable viscosity until about 0.50 molecule has been added.

Although still greater additions are impractical because of loss of reactivity and tendency for the glue to overpenetrate, only a very slight and commercially insignificant further decrease in viscosity occurs, the minimum point being at about 0.7 molecule per molecule of phenol in the cook, above which value further additions cause only a very gradual increase instead of a decrease in viscosity. This effect is general for our glues. This thinning effect upon further treatment with caustic soda furnishes a ready means for distinguishing our adhesives both from the Van Epps adhesive and from any other alkaline water-soluble phenolic glues. When the finally prepared Van Epps adhesive is treated with additional caustic soda as just described a substantially similar sharp decline in viscosity occurs as typified in our chart and this is true of other alkaline phenolic adhesive formulae. In contrast to these, glues prepared according to our present invention are not substantially thinned by adding caustic soda since our adhesives are already alkalized to approximately minimum viscosity. This is true regardless of the presence or absence of filler material.

The foregoing viscosity behavior is of general application in these glues and charts showing similar behavior could be made showing the effect of caustic soda on any of the other examples. Actually, of course, some slight modifications of the theoretical curve as shown in this chart occur due to the viscosity-altering influences of other elements such as ammonia, dilution water and filler which we add to improve the properties of our glues, but the curve in any case has the same significant character as shown in this typical chart.

For example, as stated in the description of Example II, the caustic soda, ammonia and dilution water are added successively, the caustic soda addition being about 0.3 molecule. Due to the diluting influence of the other elements, the viscosity is actually depressed to about 25 units which is at about the extreme lower limit for plywood spreadability. However, this depression of the viscosity is intentional and advantageous because, as explained in the example, it makes it possible to ship to the plywood plants a thin liquid that is easily poured in and out of drums and also has some additional stability because of its lower viscosity. It is then readily possible for the plywood plant to add the needed amount of filler in the glue mixer and thus bring the viscosity up to about 130 units and also this has a desirable effect in preventing over-penetration when the glue is used in the manufacture of Douglas fir plywood. Of course, since the filler, by increasing solids content, acts as a viscosity-increasing element, it would be impractical to add it at any of the earlier stages when the viscosity is already high.

EFFECT OF METHYL ALCOHOL

The useful effects which we obtain from methyl alcohol may be duplicated with ethyl alcohol but, in general, the methyl alcohol is most convenient and economical. The higher alcohols we have not found to be useful.

Commercial formalin, besides the usual 37% content of formaldehyde by weight, ordinarily contains from 6% to 14% of methanol as a stabilizer. Its function is principally to prevent the formaldehyde from polymerizing and going out of solution as paraformaldehyde if the formalin is unduly chilled. For this reason, the higher methanol contents, ranging from about 10% to 20%, are used in so-called "winter" grades of formalin while the lower amounts, ranging from about 6% to 10%, used in the so-called "summer" grade, are sufficient to stabilize the formalin where low temperature storage conditions are unlikely.

We find, when the methanol content of the formalin used in making the resin is less than about 10%, there is a perceptible diminution of resin reactivity which seems to become more marked as the methanol is reduced to about 7%, below which there does not seem to be any striking difference. When the methanol content is between 10% and 20%, preferably about 12%, we find that maximum reactivity is obtained, and, since there is no further gain in reactivity above that figure, it is necessary only to bring the alcohol content of the formalin up to about 12%. By using a winter grade of formalin having a methanol content of about 12%, the optimum amount is automatically supplied without cost.

EFFECT OF ADDING AMMONIA

We find that when ammonia is added to the glue (as illustrated in the preceding examples) in an amount exactly sufficient to eliminate the odor of formaldehyde and not sufficient to leave an ammoniacal odor, the storage life of the glue is considerably increased without sacrifice of reactivity and, of course, the absence of formaldehyde odor eliminates annoyance to the workmen and need for a ventilating system. The increase in storage life is probably due to the ammonia radical temporarily loosely blocking some of the reactive methylol groups and thus retarding the tendency of the resin to self-polymerize. All of the glues described in the examples which contained ammonia had a storage life at usual room temperature of at least two weeks.

Variations of formulation and procedure are, of course, possible without departure from the following claims.

We claim:

1. An improved water-soluble phenolic adhesive for making hot press plywood comprising the product of an initial reaction of a phenol having a distillation range between 180° and 220° C. and not containing more than 15% of at least one phenol selected from the group consisting of orthocresol, xylenol, and mixtures thereof, aqueous formaldehyde and caustic soda, in the range between 2.25 and 3.50 molecules of formaldehyde per molecule of the phenol and caustic soda in the range between 0.15 and 0.50 molecule per molecule of the phenol, said initial reaction product having added to it 0.15 to 0.50 molecule of caustic soda per molecule of the phenol so that the total caustic content lies in the range between 0.3 and 1.0 molecule per molecule of the phenol.

2. An adhesive according to claim 1, wherein there is also added to said initial reaction product ammonia in amount to destroy the odor of free formaldehyde in the final reaction product.

3. A dry powdered adhesive comprising the dried reaction product of claim 1, said powder being soluble in water to form a quick setting hot press adhesive and the aqueous solution being resistant to thinning upon further treatment with caustic soda.

4. The method of making an improved water soluble phenolic resin adhesive for making hot press plywood which comprises the steps of initially reacting a phenol having a distillation range between 180° and 220° C. and not containing more than 15% of at least one phenol selected from the group consisting of orthocresol, xylenol, and mixtures thereof, aqueous formaldehyde and caustic soda in the range between 2.25 and 3.50 molecules of formaldehyde per molecule of the phenol and caustic soda in the range between 0.15 and 0.50 molecule per molecule of the phenol, and adding to and reacting with said initial reaction product 0.15 to 0.50 molecule of caustic soda per molecule of the phenol so that the total caustic content lies in the range between 0.3 and 1.0 molecule per molecule of the phenol, whereby to produce an adhesive which is resistant to thinning upon further addition of caustic soda.

5. The method according to claim 4, comprising also adding ammonia to said initial reaction product in amount effective to destroy the odor of free formaldehyde and insufficient to impart an odor of ammonia in the final reaction product, and whereby the storage life of the adhesive is increased.

JOHN THOMAS STEPHAN.
REINO ALEXANDER JARVI.
JACOB RICHARD ASH.

REFERENCES CITED

The following references are of record in the file of this patent:

UNITED STATES PATENTS

| Number | Name | Date |
| --- | --- | --- |
| 1,731,072 | Landt et al. | Oct. 8, 1929 |
| 1,894,088 | Dent | Jan. 10, 1933 |
| 2,150,698 | Nevin | Mar. 14, 1939 |
| 2,360,376 | Van Epps | Oct. 17, 1944 |

---

Certificate of Correction

Patent No. 2,437,981.

March 16, 1948.

JOHN THOMAS STEPHAN ET AL.

It is hereby certified that error appears in the printed specification of the above numbered patent requiring correction as follows: Column 2, lines 10 and 11, for "distin- Van Epps adhesive. By-product methanol is" read *distinguishing enhanced reactivity of our glue, it is,*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.* phenol so that the total caustic content lies in the range between 0.3 and 1.0 molecule per molecule of the phenol.

2. An adhesive according to claim 1, wherein there is also added to said initial reaction product ammonia in amount to destroy the odor of free formaldehyde in the final reaction product.

3. A dry powdered adhesive comprising the dried reaction product of claim 1, said powder being soluble in water to form a quick setting hot press adhesive and the aqueous solution being resistant to thinning upon further treatment with caustic soda.

4. The method of making an improved water soluble phenolic resin adhesive for making hot press plywood which comprises the steps of initially reacting a phenol having a distillation range between 180° and 220° C. and not containing more than 15% of at least one phenol selected from the group consisting of orthocresol, xylenol, and mixtures thereof, aqueous formaldehyde and caustic soda in the range between 2.25 and 3.50 molecules of formaldehyde per molecule of the phenol and caustic soda in the range between 0.15 and 0.50 molecule per molecule of the phenol, and adding to and reacting with said initial reaction product 0.15 to 0.50 molecule of caustic soda per molecule of the phenol so that the total caustic content lies in the range between 0.3 and 1.0 molecule per molecule of the phenol, whereby to produce an adhesive which is resistant to thinning upon further addition of caustic soda.

5. The method according to claim 4, comprising also adding ammonia to said initial reaction product in amount effective to destroy the odor of free formaldehyde and insufficient to impart an odor of ammonia in the final reaction product, and whereby the storage life of the adhesive is increased.

JOHN THOMAS STEPHAN.
REINO ALEXANDER JARVI.
JACOB RICHARD ASH.

REFERENCES CITED

The following references are of record in the file of this patent:

UNITED STATES PATENTS

| Number | Name | Date |
|---|---|---|
| 1,731,072 | Landt et al. | Oct. 8, 1929 |
| 1,894,088 | Dent | Jan. 10, 1933 |
| 2,150,698 | Nevin | Mar. 14, 1939 |
| 2,360,376 | Van Epps | Oct. 17, 1944 |

---

Certificate of Correction

Patent No. 2,437,981.             March 16, 1948.

JOHN THOMAS STEPHAN ET AL.

It is hereby certified that error appears in the printed specification of the above numbered patent requiring correction as follows: Column 2, lines 10 and 11, for "distin- Van Epps adhesive. By-product methanol is" read *distinguishing enhanced reactivity of our glue, it is,*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*